(12) United States Patent
Wang et al.

(10) Patent No.: US 11,741,250 B2
(45) Date of Patent: Aug. 29, 2023

(54) RANDOM ACCESS FOR CHUNKED AND COMPRESSED FILES

(71) Applicant: Box, Inc., Redwood City, CA (US)

(72) Inventors: Xiaodong Wang, Fremont, CA (US); Kirill Minkovich, Redwood City, CA (US); Mindy Yang, Denver, CO (US); Mohammed Alhalalsheh, San Jose, CA (US)

(73) Assignee: Box, Inc., Redwood City, CA (US)

( * ) Notice: Subject to any disclaimer, the term of this patent is extended or adjusted under 35 U.S.C. 154(b) by 67 days.

(21) Appl. No.: 17/316,967

(22) Filed: May 11, 2021

(65) Prior Publication Data

US 2022/0366067 A1    Nov. 17, 2022

(51) Int. Cl.
*G06F 21/62* (2013.01)
*G06F 21/60* (2013.01)
*G06F 21/78* (2013.01)
*H04L 29/08* (2006.01)
*H04L 67/1097* (2022.01)
*H04L 67/06* (2022.01)

(52) U.S. Cl.
CPC ........ *G06F 21/6218* (2013.01); *G06F 21/602* (2013.01); *G06F 21/78* (2013.01); *H04L 67/06* (2013.01); *H04L 67/1097* (2013.01)

(58) Field of Classification Search
CPC .... G06F 21/6218; G06F 21/602; G06F 21/78; H04L 67/06; H04L 67/1097
See application file for complete search history.

(56) References Cited

U.S. PATENT DOCUMENTS

| 8,943,032 B1* | 1/2015 | Xu | G06F 16/119 |
| | | | 707/661 |
| 10,666,707 B2* | 5/2020 | Goll | H04L 67/5681 |
| 2011/0231569 A1* | 9/2011 | Luby | H04N 21/84 |
| | | | 709/234 |

FOREIGN PATENT DOCUMENTS

WO    WO-2014113603 A2 *   7/2014   ......... H04L 65/4084

OTHER PUBLICATIONS

"Inside the Magic Pocket"—James Cowling, Dropbox Tech, May 6, 2016 https://dropbox.tech/infrastructure/inside-the-magic-pocket (Year: 2016).*

(Continued)

*Primary Examiner* — Randy A Scott
(74) *Attorney, Agent, or Firm* — Sheridan Ross P.C.

(57) ABSTRACT

Embodiments of the disclosure provide systems and methods for providing random access to segmented and encrypted or compressed data stored in a repository. Retrieving at least a portion of a file stored in a repository can comprise storing a plurality of files in the repository. A request to retrieve at least a portion of one of the plurality of files can be received and object metadata for the requested one of the plurality of files can be obtained. A determination can be made based on the obtained metadata as to whether the requested one of the plurality of files is a multipart file. In response to determining the requested one of the plurality of files is not a multipart file, a single file retrieval process performing and in response to determining the requested one or the plurality of files is a multipart file, a multipart retrieval process can be performed.

17 Claims, 11 Drawing Sheets

(56) References Cited

OTHER PUBLICATIONS

"Workbox Range Requests"—Chrome Developers, Workbox Modules Nov. 27, 2017 https://developer.chrome.com/docs/workbox/modules/workbox-range-request/ (Year: 2017).*
Cowling, "Inside the Magic Pocket," May 6, 2016, Dropbox Tech, retrieved from https://dropbox.tech/infrastructure/inside-the-magic-pocket, 17 pages.

* cited by examiner

RANDOM ACCESS FOR CHUNKED AND COMPRESSED FILES

FIELD OF THE DISCLOSURE

Embodiments of the present disclosure relate generally to methods and systems for accessing data stored in a repository and more particularly to providing random access to segmented and compressed data stored in a repository.

BACKGROUND

A cloud-based storage environment may allow a user or system accessing the cloud-based storage environment to download any arbitrary part of a file. In such a range request, the user or system accessing the cloud-based storage environment can specify a range of data, e.g., in bytes, to download or access. If the data is not compressed, this can be done easily by reading the requested portion from a stored file. However, if the data is compressed, the file size is changed and it cannot be determined how to map the range before compression to the range afterwards. Also, a file cannot be decompressed from the middle. Rather, the file needs to be decompressed from the beginning.

One solution is to decompress the whole file then return the part requested. However, a cloud-based storage environment may store very large files of several gigabytes. Therefore, this approach is not efficient in terms of either performance or cost. Additionally, such large files may be split into parts when uploaded and compressed separately, further complicating the problem. Hence, there is a need for improved methods and systems for providing random access to segmented and compressed data stored in a repository.

BRIEF SUMMARY

Embodiments of the disclosure provide systems and methods for providing random access to segmented and compressed data stored in a repository. According to one embodiment, a method for retrieving at least a portion of a file stored in a repository can comprise storing a plurality of files in the repository. At least one of the files of the plurality of files can comprise a multipart file. The multipart file can be segmented into a plurality of parts, each part comprising a plurality of frames. Each part of the plurality of parts can be associated with an index for the plurality of frames in the part. The index for each of the plurality of parts can comprise a frame number for each frame in the part, a frame offset for each frame in the part, a frame length for each compressed frame in the part, and an original length for each frame in the part. At least one part of the plurality of parts can be compressed before being stored by the cloud-based storage system.

A request to retrieve at least a portion of one of the plurality of files can be received and object metadata for the requested one of the plurality of files can be obtained. A determination can be made based on the obtained metadata as to whether the requested one of the plurality of files is a multipart file. In response to determining the requested one of the plurality of files is not a multipart file, a single file retrieval process performing and in response to determining the requested one or the plurality of files is a multipart file, a multipart retrieval process can be performed.

Performing the multipart retrieval process can further comprise determining whether the received request to retrieve at least a portion of one of the plurality of files comprises a range request. In response to determining the received request is a range request, calculating selected parts of the file to retrieve based on an index setup range filter and performing a multipart retrieval process for the selected parts of the file. Performing the multipart retrieval process for the selected parts of the file comprises determining whether the file has been compressed and in response to determining the file has been compressed, calculating a start from for retrieval based on the index, setting up a range filter for the selected parts, retrieving the requested range of frame from the calculated start frame, buffering the retrieved range of frame, and decompressing the retrieved range of frames. In response to determining the file has not been compressed, a decryption offset and start position can be aligned, the requested range can be retrieved, and the retrieved part can be streamed.

In response to determining the received request is not a range request, a retrieval for all of the file can be performed. Performing the retrieval for all parts of the file can comprise retrieving the calculated selected part, checking an extended attribute for the retrieved part, determining, based on the extended attribute for the selected part, whether the selected part is compressed and in response to determining the selected part is compressed, buffering a frame for the selected part and decrypting the frame for the selected part. In response to determining the selected part is not encrypted, a decryption offset can be aligned and the retrieved part can be streamed.

According to another embodiment, a system can comprise a processor and a memory coupled with and readable by the processor. The memory can store therein a set of instructions which, when executed by the processor, causes the processor to retrieve at least a portion of a file stored in a repository by storing a plurality of files in the repository. At least one of the files of the plurality of files can comprise a multipart file. The multipart file can be segmented into a plurality of parts, each part comprising a plurality of frames. Each part of the plurality of parts is associated with an index for the plurality of frames in the part. The index for each of the plurality of parts can comprise a frame number for each frame in the part, a frame offset for each frame in the part, a frame length for each compressed frame in the part, and an original length for each frame in the part. At least one part of the plurality of parts can be compressed before being stored by the cloud-based storage system.

A request to retrieve at least a portion of one of the plurality of files can be received and object metadata for the requested one of the plurality of files can be obtained. A determination can be made based on the obtained metadata as to whether the requested one of the plurality of files is a multipart file. In response to determining the requested one of the plurality of files is not a multipart file, a single file retrieval process performing and in response to determining the requested one or the plurality of files is a multipart file, a multipart retrieval process can be performed.

Performing the multipart retrieval process can further comprise determining whether the received request to retrieve at least a portion of one of the plurality of files comprises a range request. In response to determining the received request is a range request, calculating selected parts of the file to retrieve based on an index setup range filter and performing a multipart retrieval process for the selected parts of the file. Performing the multipart retrieval process for the selected parts of the file comprises determining whether the file has been compressed and in response to determining the file has been compressed, calculating a start from for retrieval based on the index, setting up a range filter for the selected parts, retrieving the requested range of frame from the calculated start frame, buffering the retrieved range of frame, and decompressing the retrieved range of frames. In response to determining the file has not been compressed, a decryption offset and start position can be aligned, the requested range can be retrieved, and the retrieved part can be streamed.

In response to determining the received request is not a range request, a retrieval for all of the file can be performed. Performing the retrieval for all parts of the file can comprise retrieving the calculated selected part, checking an extended attribute for the retrieved part, determining, based on the extended attribute for the selected part, whether the selected part is compressed and in response to determining the selected part is compressed, buffering a frame for the selected part and decrypting the frame for the selected part. In response to determining the selected part is not encrypted, a decryption offset can be aligned and the retrieved part can be streamed.

According to yet another embodiment, a non-transitory, computer-readable medium can comprise a set of instructions stored therein which, when executed by a processor, causes the processor to retrieve at least a portion of a file stored in a repository by storing a plurality of files in the repository. At least one of the files of the plurality of files can comprise a multipart file. The multipart file can be segmented into a plurality of parts, each part comprising a plurality of frames. each part of the plurality of parts is associated with an index for the plurality of frames in the part. The index for each of the plurality of parts can comprise a frame number for each frame in the part, a frame offset for each frame in the part, a frame length for each compressed frame in the part, and an original length for each frame in the part. At least one part of the plurality of parts can be compressed before being stored by the cloud-based storage system.

A request to retrieve at least a portion of one of the plurality of files can be received and object metadata for the requested one of the plurality of files can be obtained. A determination can be made based on the obtained metadata as to whether the requested one of the plurality of files is a multipart file. In response to determining the requested one of the plurality of files is not a multipart file, a single file retrieval process performing and in response to determining the requested one or the plurality of files is a multipart file, a multipart retrieval process can be performed.

Performing the multipart retrieval process can further comprise determining whether the received request to retrieve at least a portion of one of the plurality of files comprises a range request. In response to determining the received request is a range request, calculating selected parts of the file to retrieve based on an index setup range filter and performing a multipart retrieval process for the selected parts of the file. Performing the multipart retrieval process for the selected parts of the file comprises determining whether the file has been compressed and in response to determining the file has been compressed, calculating a start from for retrieval based on the index, setting up a range filter for the selected parts, retrieving the requested range of frame from the calculated start frame, buffering the retrieved range of frame, and decompressing the retrieved range of frames. In response to determining the file has not been compressed, a decryption offset and start position can be aligned, the requested range can be retrieved, and the retrieved part can be streamed.

In response to determining the received request is not a range request, a retrieval for all of the file can be performed. Performing the retrieval for all parts of the file can comprise retrieving the calculated selected part, checking an extended attribute for the retrieved part, determining, based on the extended attribute for the selected part, whether the selected part is compressed and in response to determining the selected part is compressed, buffering a frame for the selected part and decrypting the frame for the selected part. In response to determining the selected part is not encrypted, a decryption offset can be aligned and the retrieved part can be streamed.

Figure 1:
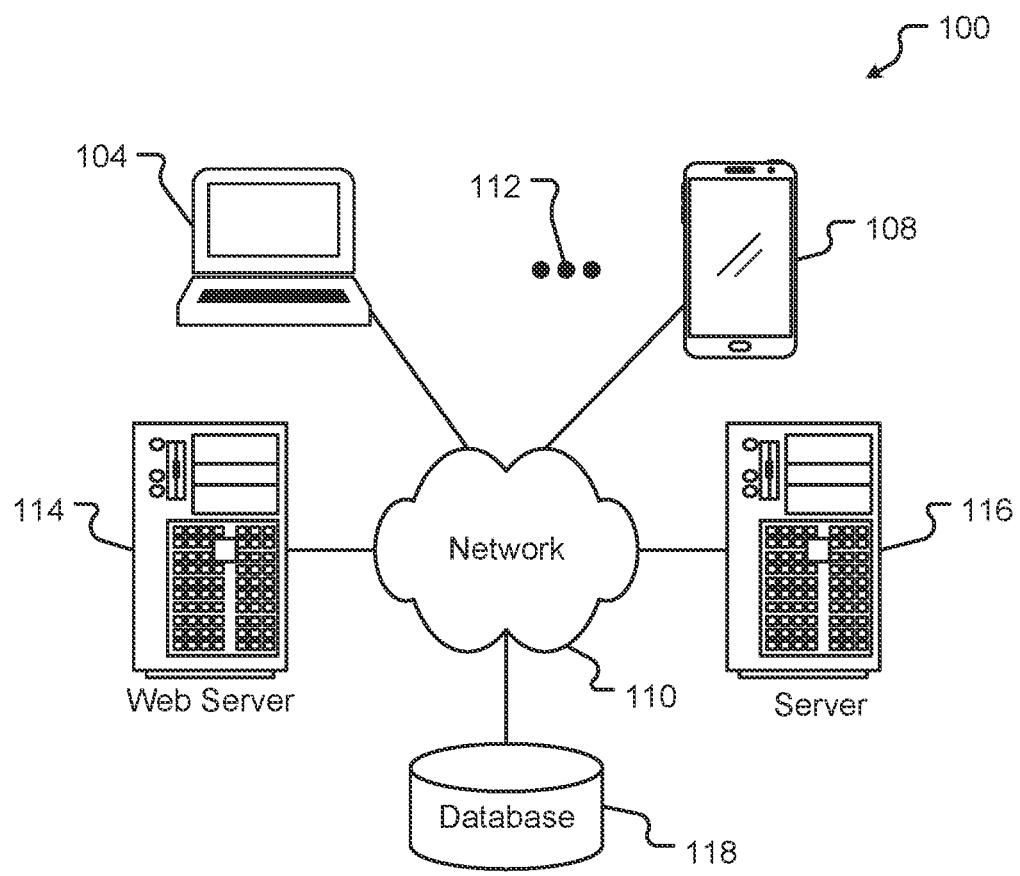
FIG. 1 is a block diagram illustrating elements of an exemplary computing environment in which embodiments of the present disclosure may be implemented.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

In the following description, for the purposes of explanation, numerous specific details are set forth in order to provide a thorough understanding of various embodiments disclosed herein. It will be apparent, however, to one skilled in the art that various embodiments of the present disclosure may be practiced without some of these specific details. The ensuing description provides exemplary embodiments only and is not intended to limit the scope or applicability of the disclosure. Furthermore, to avoid unnecessarily obscuring the present disclosure, the preceding description omits a number of known structures and devices. This omission is not to be construed as a limitation of the scopes of the claims. Rather, the ensuing description of the exemplary embodiments will provide those skilled in the art with an enabling description for implementing an exemplary embodiment. It should however be appreciated that the present disclosure may be practiced in a variety of ways beyond the specific detail set forth herein.

While the exemplary aspects, embodiments, and/or configurations illustrated herein show the various components of the system collocated, certain components of the system can be located remotely, at distant portions of a distributed network, such as a Local-Area Network (LAN) and/or Wide-Area Network (WAN) such as the Internet, or within a dedicated system. Thus, it should be appreciated, that the components of the system can be combined in to one or more devices or collocated on a particular node of a distributed network, such as an analog and/or digital telecommunications network, a packet-switch network, or a circuit-switched network. It will be appreciated from the following description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and fiber optics, and may take the form of acoustic or light waves, such as those generated during radio-wave and infra-red data communications.

As used herein, the phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

The term "computer-readable medium" as used herein refers to any tangible storage and/or transmission medium that participate in providing instructions to a processor for execution. Such a medium may take many forms, including but not limited to, non-volatile media, volatile media, and transmission media. Non-volatile media includes, for example, Non-Volatile Random-Access Memory (NVRAM), or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a Compact Disk Read-Only Memory (CD-ROM), any other optical medium, punch cards, paper tape, any other physical medium with patterns of holes, a Random-Access Memory (RAM), a Programmable Read-Only Memory (PROM), and Erasable Programmable Read-Only Memory (EPROM), a Flash-EPROM, a solid state medium like a memory card, any other memory chip or cartridge, a carrier wave as described hereinafter, or any other medium from which a computer can read. A digital file attachment to e-mail or other self-contained information archive or set of archives is considered a distribution medium equivalent to a tangible storage medium. When the computer-readable media is configured as a database, it is to be understood that the database may be any type of database, such as relational, hierarchical, object-oriented, and/or the like. Accordingly, the disclosure is considered to include a tangible storage medium or distribution medium and prior art-recognized equivalents and successor media, in which the software implementations of the present disclosure are stored.

A "computer readable signal" medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, Radio Frequency (RF), etc., or any suitable combination of the foregoing.

The terms "determine," "calculate," and "compute," and variations thereof, as used herein, are used interchangeably and include any type of methodology, process, mathematical operation or technique.

It shall be understood that the term "means" as used herein shall be given its broadest possible interpretation in accordance with 35 U.S.C., Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary of the disclosure, brief description of the drawings, detailed description, abstract, and claims themselves.

Aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Any combination of one or more computer readable medium(s) may be utilized. The computer readable medium may be a computer readable signal medium or a computer readable storage medium.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as Programmable Logic Device (PLD), Programmable Logic Array (PLA), Field Programmable Gate Array (FPGA), Programmable Array Logic (PAL), special purpose computer, any comparable means, or the like. In general, any device(s) or means capable of implementing the methodology illustrated herein can be used to implement the various aspects of this disclosure. Exemplary hardware that can be used for the disclosed embodiments, configurations, and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or Very Large-Scale Integration (VLSI) design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or Common Gateway Interface (CGI) script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

Various additional details of embodiments of the present disclosure will be described below with reference to the figures. While the flowcharts will be discussed and illustrated in relation to a particular sequence of events, it should be appreciated that changes, additions, and omissions to this sequence can occur without materially affecting the operation of the disclosed embodiments, configuration, and aspects.

FIG. 1 is a block diagram illustrating elements of an exemplary computing environment in which embodiments of the present disclosure may be implemented. More specifically, this example illustrates a computing environment 100 that may function as the servers, user computers, or other systems provided and described herein. The environment 100 includes one or more user computers, or computing devices, such as a computing device 104, a communication device 108, and/or more 112. The computing devices 104, 108, 112 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 104, 108, 112 may also have any of a variety of applications, including for example, database client and/or server applications, and web browser applications. Alternatively, the computing devices 104, 108, 112 may be any other electronic device, such as a thin-client computer, Internet-enabled mobile telephone, and/or personal digital assistant, capable of communicating via a network 110 and/or displaying and navigating web pages or other types of electronic documents. Although the exemplary computer environment 100 is shown with two computing devices, any number of user computers or computing devices may be supported.

Environment 100 further includes a network 110. The network 110 may can be any type of network familiar to those skilled in the art that can support data communications using any of a variety of commercially-available protocols, including without limitation Session Initiation Protocol (SIP), Transmission Control Protocol/Internet Protocol (TCP/IP), Systems Network Architecture (SNA), Internetwork Packet Exchange (IPX), AppleTalk, and the like. Merely by way of example, the network 110 maybe a Local Area Network (LAN), such as an Ethernet network, a Token-Ring network and/or the like; a wide-area network; a virtual network, including without limitation a Virtual Private Network (VPN); the Internet; an intranet; an extranet; a Public Switched Telephone Network (PSTN); an infra-red network; a wireless network (e.g., a network operating under any of the IEEE 802.9 suite of protocols, the Bluetooth® protocol known in the art, and/or any other wireless protocol); and/or any combination of these and/or other networks.

The system may also include one or more servers 114, 116. In this example, server 114 is shown as a web server and server 116 is shown as an application server. The web server 114, which may be used to process requests for web pages or other electronic documents from computing devices 104, 108, 112. The web server 114 can be running an operating system including any of those discussed above, as well as any commercially-available server operating systems. The web server 114 can also run a variety of server applications, including SIP servers, HyperText Transfer Protocol (secure) (HTTP(s)) servers, FTP servers, CGI servers, database servers, Java servers, and the like. In some instances, the web server 114 may publish operations available operations as one or more web services.

The environment 100 may also include one or more file and or/application servers 116, which can, in addition to an operating system, include one or more applications accessible by a client running on one or more of the computing devices 104, 108, 112. The server(s) 116 and/or 114 may be one or more general purpose computers capable of executing programs or scripts in response to the computing devices 104, 108, 112. As one example, the server 116, 114 may execute one or more web applications. The web application may be implemented as one or more scripts or programs written in any programming language, such as Java™, C, C#®, or C++, and/or any scripting language, such as Perl, Python, or Tool Command Language (TCL), as well as combinations of any programming/scripting languages. The application server(s) 116 may also include database servers, including without limitation those commercially available from Oracle®, Microsoft®, Sybase®, IBM® and the like, which can process requests from database clients running on a computing device 104, 108, 112.

The web pages created by the server 114 and/or 116 may be forwarded to a computing device 104, 108, 112 via a web (file) server 114, 116. Similarly, the web server 114 may be able to receive web page requests, web services invocations, and/or input data from a computing device 104, 108, 112 (e.g., a user computer, etc.) and can forward the web page requests and/or input data to the web (application) server 116. In further embodiments, the server 116 may function as a file server. Although for ease of description, FIG. 1 illustrates a separate web server 114 and file/application server 116, those skilled in the art will recognize that the functions described with respect to servers 114, 116 may be performed by a single server and/or a plurality of specialized servers, depending on implementation-specific needs and parameters. The computer systems 104, 108, 112, web (file) server 114 and/or web (application) server 116 may function as the system, devices, or components described herein.

The environment 100 may also include a database 118. The database 118 may reside in a variety of locations. By way of example, database 118 may reside on a storage medium local to (and/or resident in) one or more of the computers 104, 108, 112, 114, 116. Alternatively, it may be remote from any or all of the computers 104, 108, 112, 114, 116, and in communication (e.g., via the network 110) with one or more of these. The database 118 may reside in a Storage-Area Network (SAN) familiar to those skilled in the art. Similarly, any necessary files for performing the functions attributed to the computers 104, 108, 112, 114, 116 may be stored locally on the respective computer and/or remotely, as appropriate. The database 118 may be a relational database, such as Oracle 20i®, that is adapted to store, update, and retrieve data in response to Structured Query Language (SQL) formatted commands.

Figure 2:
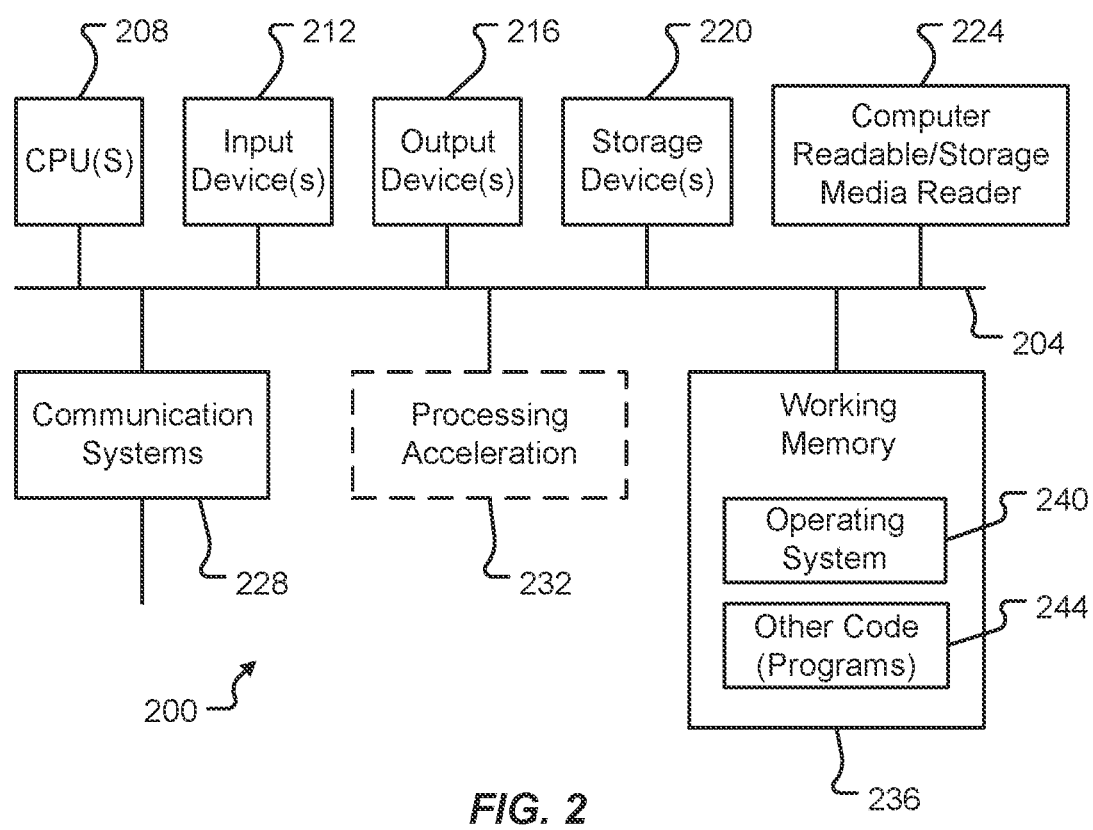
FIG. 2 is a block diagram illustrating elements of an exemplary computing device in which embodiments of the present disclosure may be implemented.

FIG. 2 is a block diagram illustrating elements of an exemplary computing device in which embodiments of the present disclosure may be implemented. More specifically, this example illustrates one embodiment of a computer system 200 upon which the servers, user computers, computing devices, or other systems or components described above may be deployed or executed. The computer system 200 is shown comprising hardware elements that may be electrically coupled via a bus 204. The hardware elements may include one or more Central Processing Units (CPUs) 208; one or more input devices 212 (e.g., a mouse, a keyboard, etc.); and one or more output devices 216 (e.g., a display device, a printer, etc.). The computer system 200 may also include one or more storage devices 220. By way of example, storage device(s) 220 may be disk drives, optical storage devices, solid-state storage devices such as a Random-Access Memory (RAM) and/or a Read-Only Memory (ROM), which can be programmable, flash-updateable and/or the like.

The computer system 200 may additionally include a computer-readable storage media reader 224; a communications system 228 (e.g., a modem, a network card (wireless or wired), an infra-red communication device, etc.); and working memory 236, which may include RAM and ROM devices as described above. The computer system 200 may also include a processing acceleration unit 232, which can include a Digital Signal Processor (DSP), a special-purpose processor, and/or the like.

The computer-readable storage media reader 224 can further be connected to a computer-readable storage medium, together (and, optionally, in combination with storage device(s) 220) comprehensively representing remote, local, fixed, and/or removable storage devices plus storage media for temporarily and/or more permanently containing computer-readable information. The communications system 228 may permit data to be exchanged with a network and/or any other computer described above with respect to the computer environments described herein. Moreover, as disclosed herein, the term "storage medium" may represent one or more devices for storing data, including ROM, RAM, magnetic RAM, core memory, magnetic disk storage mediums, optical storage mediums, flash memory devices and/or other machine-readable mediums for storing information.

The computer system 200 may also comprise software elements, shown as being currently located within a working memory 236, including an operating system 240 and/or other code 244. It should be appreciated that alternate embodiments of a computer system 200 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 208 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Figure 3:
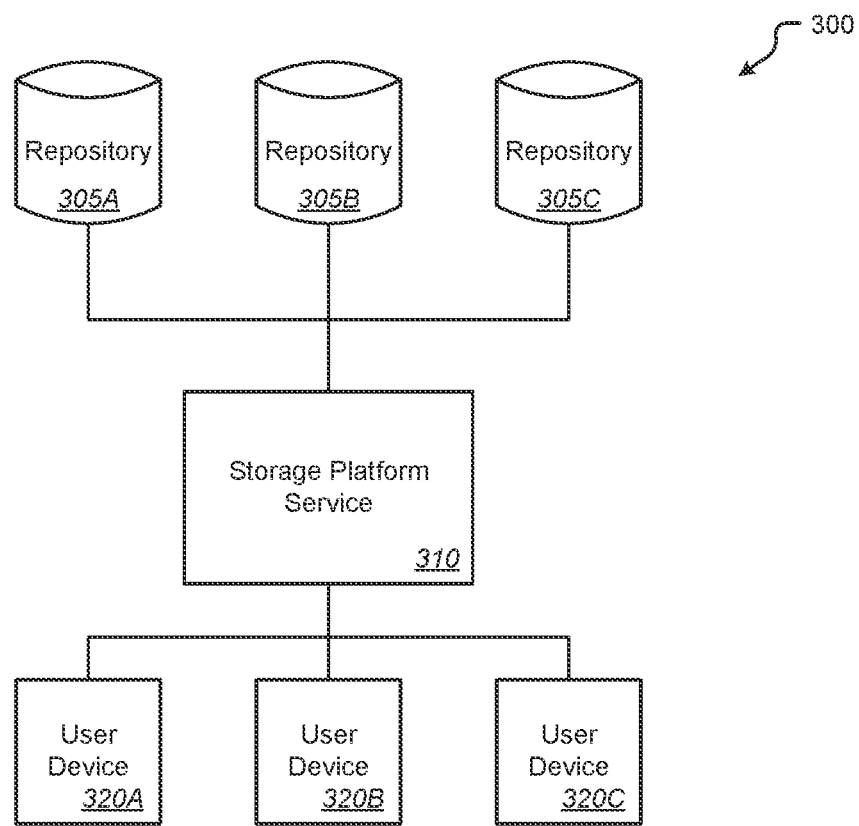
FIG. 3 is a block diagram illustrating an exemplary cloud-based storage environment in which embodiments of the present disclosure may be implemented.

FIG. 3 is a block diagram illustrating an exemplary cloud-based storage environment in which embodiments of the present disclosure may be implemented. As illustrated in this example, a cloud-based storage system 300 can comprise a set of one or more databases or other repositories 305A-305C such as described above and a storage platform service 310. The storage platform service 310 can be implemented on any one or more servers and/or other computing devices as described above and can be communicatively coupled with the repositories 305A-305C via any one or more communications networks (not shown here) as also described above. Generally speaking, the storage platform service 310 can manage data stored in the repositories 305A-305C and provide access to that data for other systems and/or devices as known in the art. The data stored in the repositories 305A-305C can be encrypted for security purposes. In some cases, the data may additionally, or alternatively, be compressed in whole or in part in order to provide more efficient storage. One or more user devices 320A-320C can be communicatively coupled with the storage platform service 310 via any one or more wired and/or wireless communications networks (not shown here) as also described above. The user devices 320A-320C can comprise any one or more personal computers, laptop computers, tablets, mobile phones, and/or other computing devices as described above.

Data stored in the repositories 305A-305C is frequently accessed in a random manner. For example, one or more user devices 320A may request a portion or range of a larger file or other set of data stored in one or more of the repositories 305A-305C. However, and as noted above, the data stored maybe compressed. If the data is compressed, the file size is changed and it cannot be determined how to map the requested range before compression to the range afterwards. Also, a file cannot be decompressed from the middle. Rather, the file needs to be decompressed from the beginning. Additionally, files stored in the repositories 305A-305C may be very large, e.g., in the gigabytes, and such large files may be split into parts when uploaded and subsequently compressed separately, further complicating the problem. Accordingly, embodiments of the present disclosure are directed to providing random access to segmented and compressed data stored in a repository.

More specifically, embodiments of the present disclosure split the original file into frames, and store the compressed frames with an index. For any random access, a start frame can be found by looking at the index, and decompressed content can be served by decompressing from the start frame. According to one embodiment, a container file format can be used to store compressed frames of a file. The container file format can also store basic information about the file including, but not limited to, whether it is compressed, what compression algorithm is used.

An index for each frame can also be used to support range requests. The index can contain information about the frame including, but not limited to, compressed size, original size before compression, a checksum for the frame, etc. With this information, the storage platform service 310 is able to map a range to frames, so it can retrieve and decompress those frames to serve the request. The indexes can be generated on-the-fly when wring a new file or can be re-generated by scanning an existing container file. The indexes can be stored in a database like HBase for quick lookup. The indexes can be considered a cache so that in the worst case, e.g., the HBase database (repository 305A-305C) being lost, the indexes can be rebuilt by scanning the container files without decrypting the file content and without impacting the ability to serve requests. To reduce cost, indexes can be stored with a TTL, e.g., two weeks, so eventually the indexes for cold files can be removed.

Embodiments also provide for random access to a multipart compressed file, i.e., a large file that has been uploaded in multiple parts due to its size and where each part is compressed separately. This introduces another layer of complexity in which a requested range will need to be mapped to one or more parts and then the frames in each part. According to one embodiment, another index for parts, i.e., an object index, is provided. The object index can have a similar structure to the frame index and can be used to map the range to the parts as a first step. Then, each part can be served in the same way as a regular compressed file.

Figure 4:
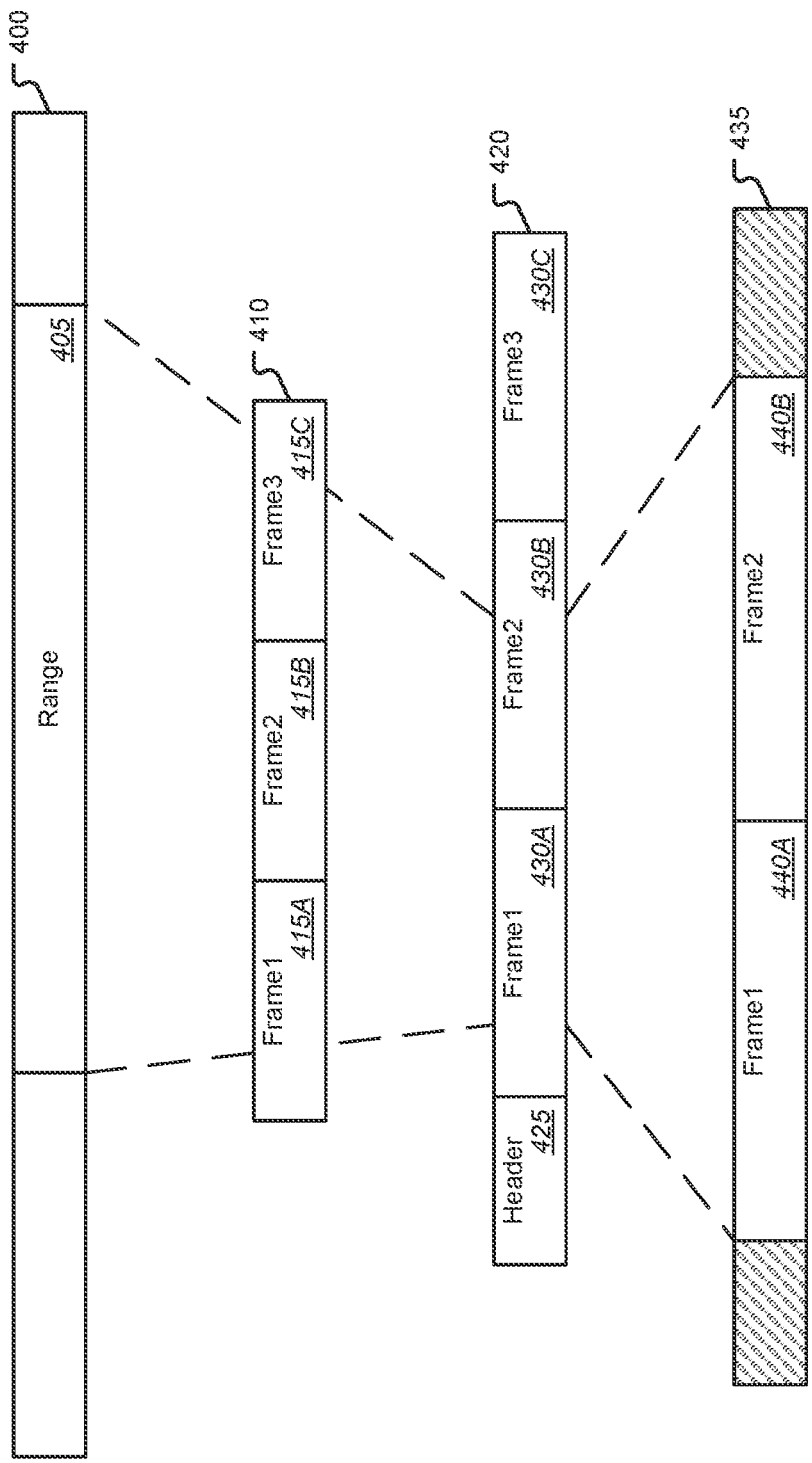
FIG. 4 is a block diagram illustrating handling of a range request for a compressed file according to one embodiment of the present disclosure.

FIG. 4 is a block diagram illustrating handling of a range request for a compressed file according to one embodiment of the present disclosure. More specifically, this example illustrates an original file 400 of which a specific range 405 is requested. In the storage platform service 310, the file can be represented by a compression index 410 of a set of frames 415A-415C representing the requested range 405. The compression index 410 can map to a compressed file 420 comprising a header 425 and the compressed frames 430A-430C of data from the original file 400. Using the mapping of this index 410 to the compressed file, the storage platform service 310 can identify which frames 430A and 430B contain the requested range 405 of the original file 400 to be retrieved and served as decompressed data 435 of frames 440A and 440B containing the requested range 405.

Figure 5:
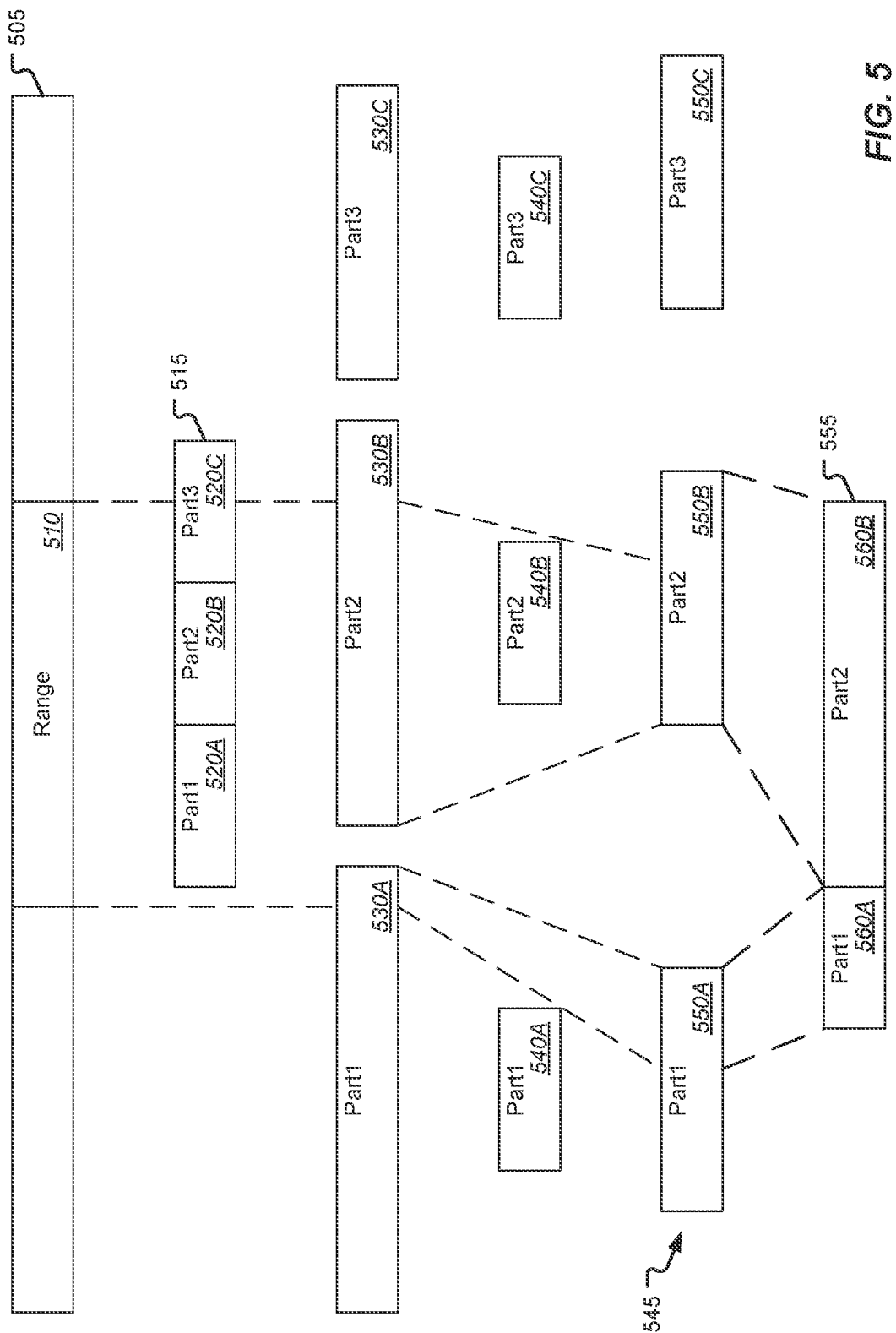
FIG. 5 is a block diagram illustrating handling of a range request for a segmented and compressed file according to one embodiment of the present disclosure.

FIG. 5 is a block diagram illustrating handling of a range request for a segmented and compressed file according to one embodiment of the present disclosure. As illustrated in this example, an original file 505 can be uploaded to the storage platform service 310. However, in this case, the original file may be uploaded in multiple parts 530A-530C, e.g., due to its size. An index 515 comprising a part index 520A-520C for each part 530A-530C can be generated and can map each part 530A-530C to the original file 505. The storage platform service 310 can also generate a compression index 540A-540C as described above for each uploaded part 530A-530C. The compression index 540A-540C can map the uploaded parts 530A-530C to the container file format objects 550A-550C of the compressed file 545. When a requested range 510 of the original file 505 is to be retrieved, the storage platform service 310 can use the mappings of the parts indexes 520A-520C to the parts 530A-530C and the mappings of the compression index 540A and 540C to the compressed file 545 to retrieve the container file format objects 550A-550B containing the requested range. These compressed container file format objects 550A-550B can then be retrieved, decompressed, and served by the storage platform service 310 as decompressed data 555 comprising parts 560A and 560B spanning the requested range 510.

Figure 6:
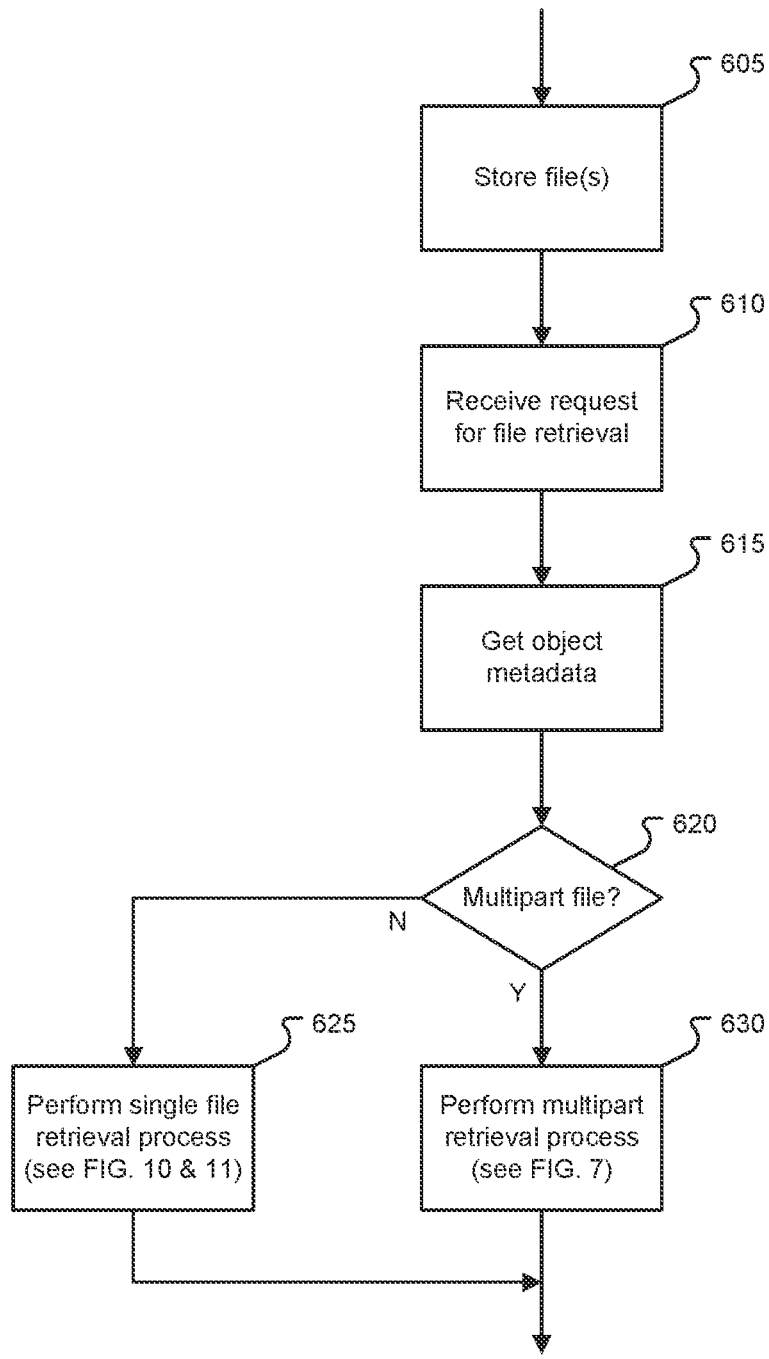
FIG. 6 is a flowchart illustrating an exemplary process for handling a file request according to one embodiment of the present disclosure.

FIG. 6 is a flowchart illustrating an exemplary process for handling a file request according to one embodiment of the present disclosure. As illustrated in this example, retrieving at least a portion of a file stored in a repository can begin with storing 605 a plurality of files in the repository. At least one of the files of the plurality of files can comprise a multipart file. The multipart file can be segmented into a plurality of parts. Each part can comprise a plurality of frames. Each part of the plurality of parts is associated with an index for the plurality of frames in the part. The index for each of the plurality of parts can comprise a frame number for each frame in the part, a frame offset for each frame in the part, a frame length for each compressed frame in the part, and an original length for each frame in the part. At least one part of the plurality of parts can be compressed before being stored by the cloud-based storage system.

A request to retrieve at least a portion of one of the plurality of files can be received 610 and object metadata for the requested one of the plurality of files can be obtained 615. A determination 620 can be made, based on the obtained metadata, as to whether the requested one of the plurality of files is a multipart file. In response to determining 620 the requested one of the plurality of files is not a multipart file, a single file retrieval process can be performed 625. Additional details of such a process will be described below with reference to FIGS. 10 and 11. In response to determining 620 the requested one or the plurality of files is a multipart file, a multipart retrieval process can be performed 630. Additional details of such a process will be described below with reference to FIG. 7.

Figure 7:
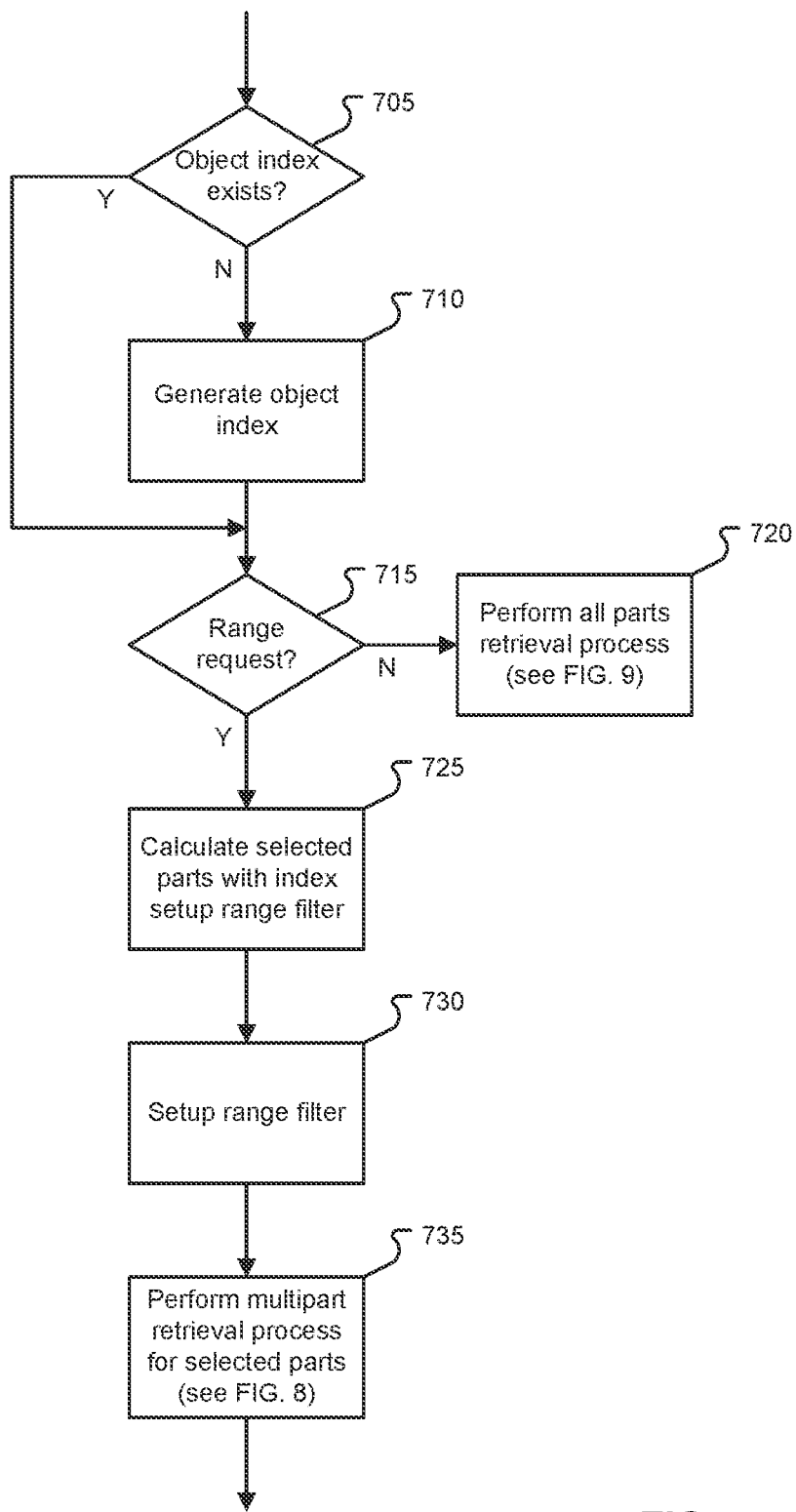
FIG. 7 is a flowchart illustrating an exemplary process for performing a multipart retrieval process according to one embodiment of the present disclosure.

FIG. 7 is a flowchart illustrating an exemplary process for performing a multipart retrieval process according to one embodiment of the present disclosure. As illustrated in this example, the process can begin with determining 705 whether a requested frame has an object index. In response to determining 705 an object index does not exist for the frame, an index can be generated 710.

A further determination can be made as to whether the received request to retrieve at least a portion of one of the plurality of files comprises a range request. In response to determining the received request is not a range request, a retrieval for all of the file can be performed. Additional details of such a process will be described below with reference to FIG. 9. In response to determining the received request is a range request, selected parts of the file to retrieve can be calculated 725 based on an index and a range filter for the selected parts that filters out the portion(s) of the frames outside of the requested range can be set up 730. A multipart retrieval process can be performed 735 for the selected parts of the file based on the range filter. Additional details of an exemplary multipart retrieval process will be described below with reference to FIG. 8.

Figure 8:
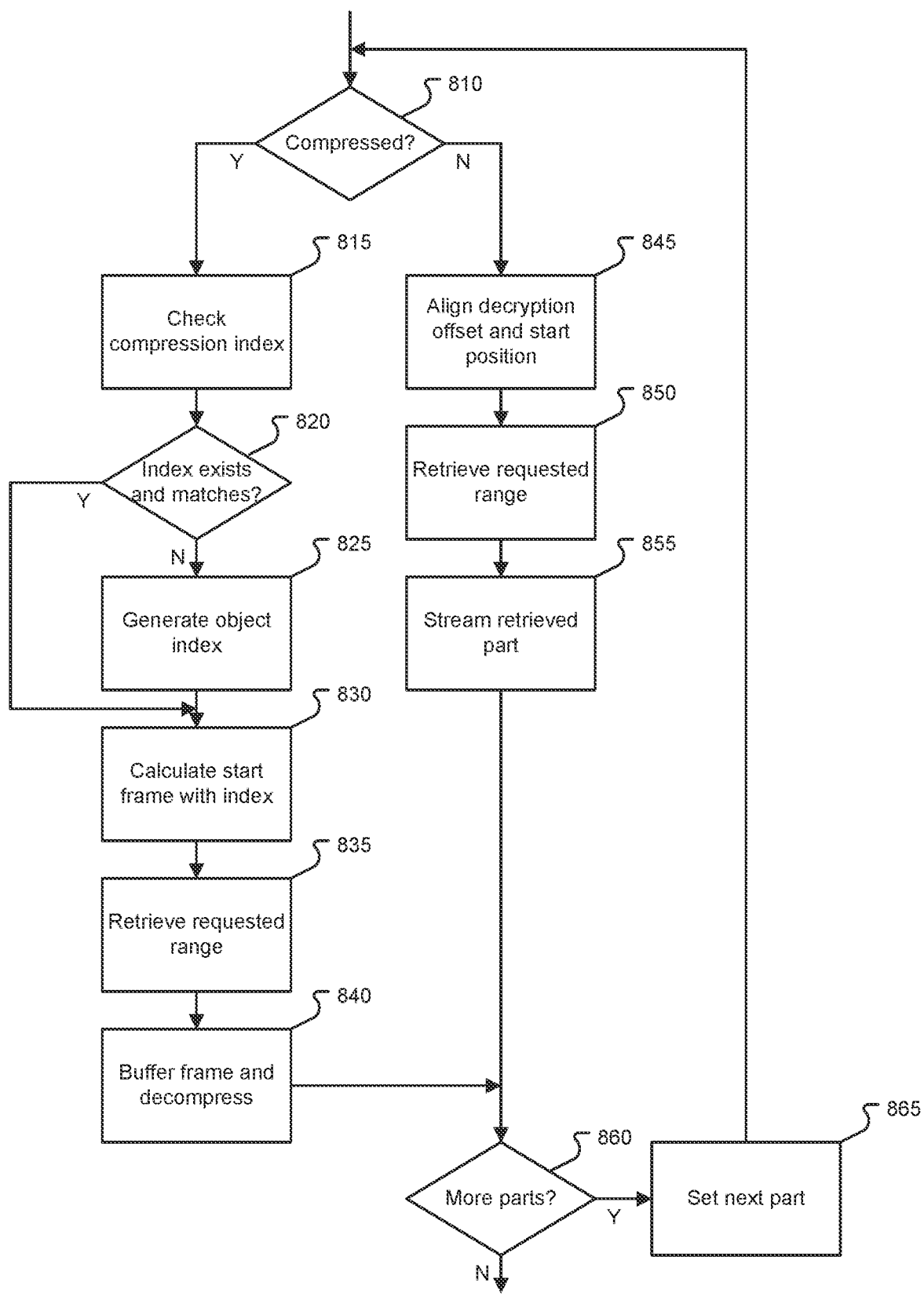
FIG. 8 is a flowchart illustrating additional details of an exemplary process for performing a multipart retrieval process for selected parts of a file according to one embodiment of the present disclosure.

FIG. 8 is a flowchart illustrating additional details of an exemplary process for performing a multipart retrieval process for selected parts of a file according to one embodiment of the present disclosure. As illustrated in this example, performing the multipart retrieval process for the selected parts of the file can comprise determining 810 whether the file has been compressed. In response to determining 810 the file has been compressed, the compression index for the selected part can be checked 815 and a determination 820 can be made as to whether the index exists and if it matches the request. In response to determining 820 that an index does not exist for the selected part, an index can be generated 825. A start frame for retrieval based on the index can be calculated 830 and the requested range of frames can be retrieved 835 from the calculated start frame. The retrieved range of frame can be buffered and decompressed 840. This process can be repeated for all parts. According, a determination 860 can be made as to whether parts remain to be retrieved. In response to determining 860 parts remain to be retrieved, the next part can be set 865 and processing can continue until all parts have been retrieved.

In response to determining 810 the file has not been compressed, a decryption offset and start position can be aligned 845, the requested range can be retrieved 850, and the retrieved part can be streamed 855. Again, this process can be repeated for all parts. According, a determination 860 can be made as to whether parts remain to be retrieved. In response to determining 860 parts remain to be retrieved, the next part can be set 865 and processing can continue until all parts have been retrieved.

Figure 9:
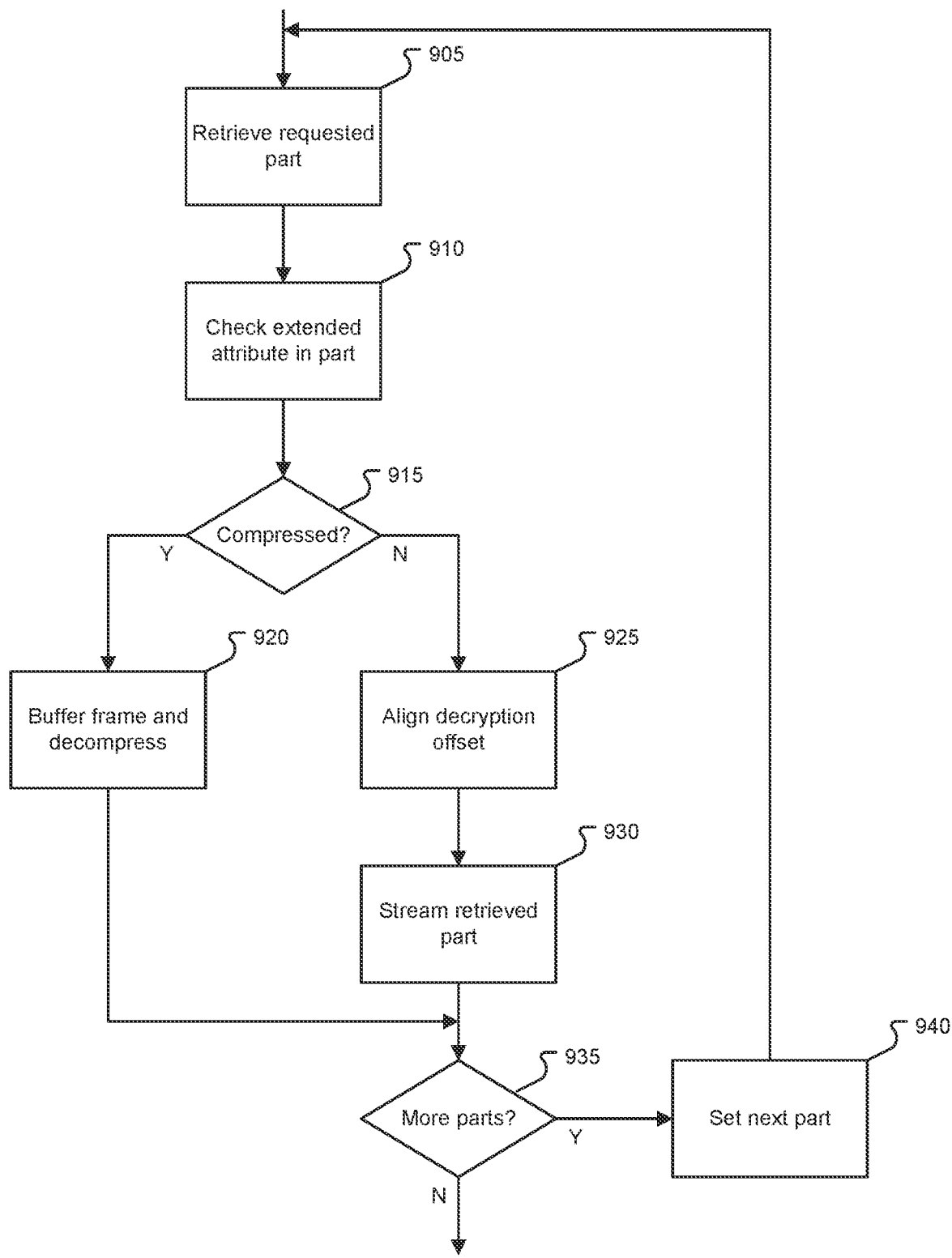
FIG. 9 is a flowchart illustrating additional details of an exemplary process for performing an all parts retrieval according to one embodiment of the present disclosure.

FIG. 9 is a flowchart illustrating additional details of an exemplary process for performing an all parts retrieval according to one embodiment of the present disclosure. As illustrated in this example, performing the retrieval for all parts of the file can comprise retrieving 905 the calculated selected part, checking 910 an extended attribute for the retrieved part, and determining 915, based on the extended attribute for the selected part, whether the selected part is compressed. In response to determining 915 the selected part is compressed, a frame for the selected part can be buffered and decrypted 920. This process can be repeated for all parts. According, a determination 935 can be made as to whether parts remain to be retrieved. In response to determining 935 parts remain to be retrieved, the next part can be set 940 and processing can continue until all parts have been retrieved.

In response to determining 915 the selected part is not encrypted, a decryption offset can be aligned 925 with a start position and the retrieved part can be streamed 930. Again, this process can be repeated for all parts. According, a determination 935 can be made as to whether parts remain to be retrieved. In response to determining 935 parts remain to be retrieved, the next part can be set 940 and processing can continue until all parts have been retrieved.

Figure 10:
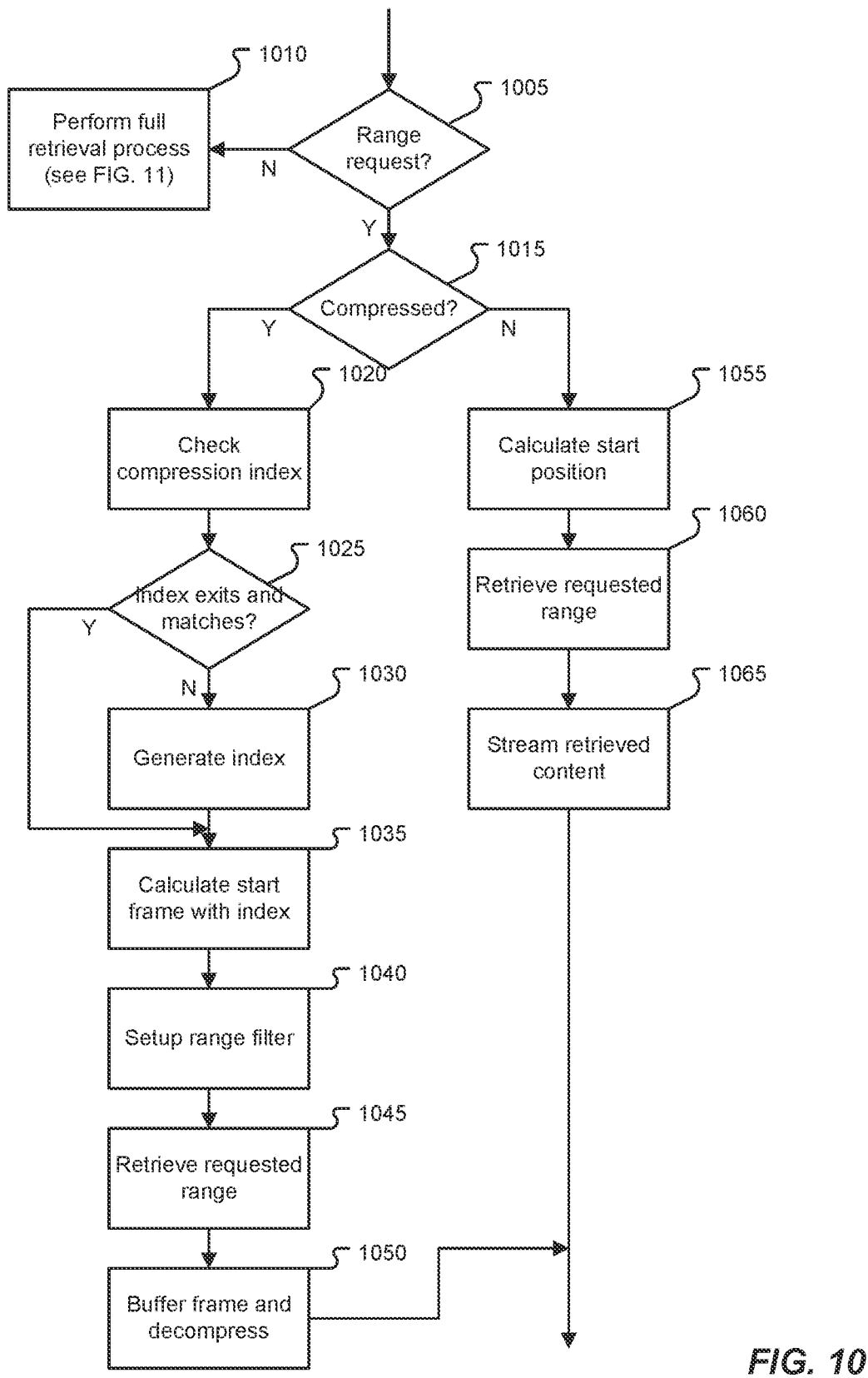
FIG. 10 is a flowchart illustrating additional details of an exemplary process for performing single file range retrieval according to one embodiment of the present disclosure.

FIG. 10 is a flowchart illustrating additional details of an exemplary process for performing single file range retrieval according to one embodiment of the present disclosure. As illustrated in this example, the process can begin with determining 1005 whether the received request is a range request. In response to determining 1005 the request is not a range request, a full retrieval process for the file can be performed 1010. Additional details of such a process will be described below with reference to FIG. 11.

In response to determining 1005 the request is a range request, a further determination 1015 can be made as to whether the requested part has been compressed. In response to determining 1015 that the requested part has been compressed, the index for the selected file can be checked 1020 and a determination 1025 can be made as to whether the index exists and if it matches the request. In response to determining 1025 that an index does not exist for the selected file, an index can be generated 1030. A start frame for retrieval based on the index can be calculated 1035, a range filter can be set up 1040 and the requested range of frames can be retrieved 1045 from the calculated start frame. The retrieved range of frame can be buffered and decompressed 1050. In response to determining 1015 the part has not been compressed, a start position can be calculated 1055, the requested range can be retrieved 1060, and the retrieved part can be streamed 1065.

Figure 11:
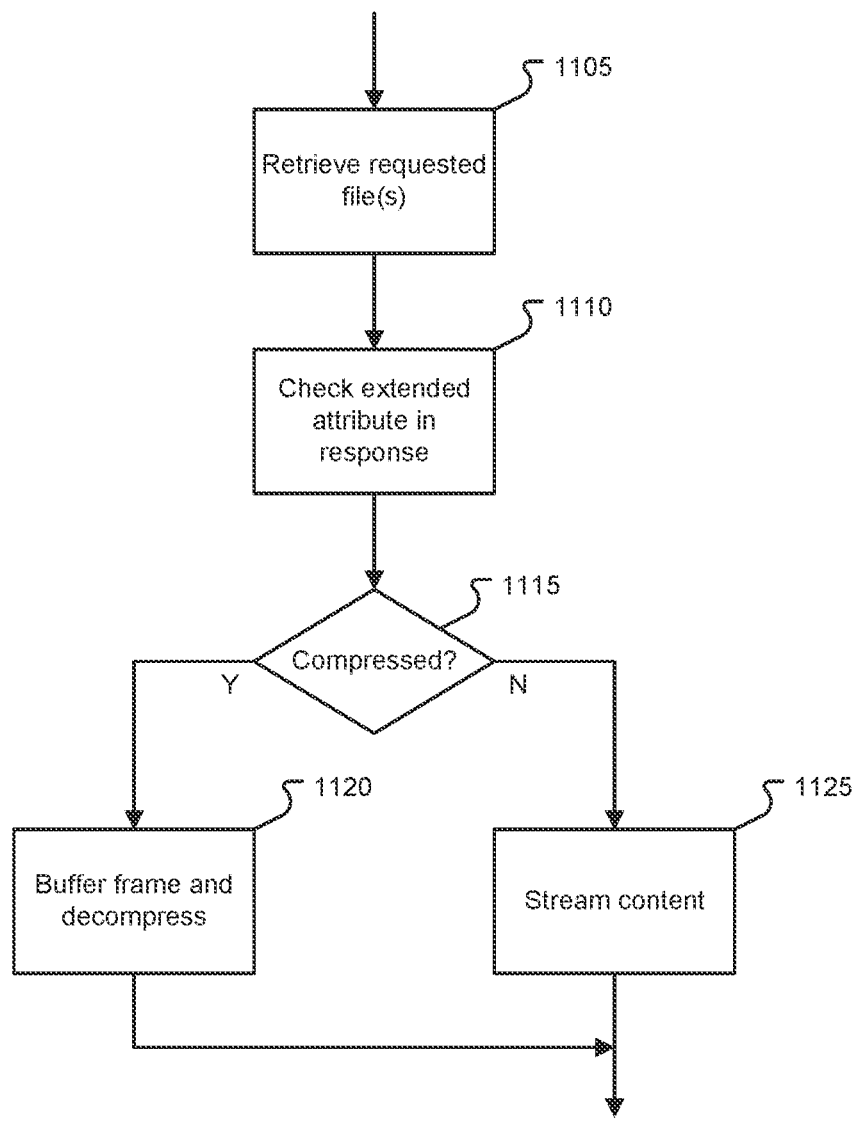
FIG. 11 is a flowchart illustrating additional details of an exemplary process for performing single file full retrieval according to one embodiment of the present disclosure.

FIG. 11 is a flowchart illustrating additional details of an exemplary process for performing single file full retrieval according to one embodiment of the present disclosure. As illustrated in this example, the process can begin with retrieving 1105 the requested file and checking 1110 checking an extended attribute in the response. A determination 1115 can be made based on the extended attribute as to whether the file has been compressed. In response to determining the file has been compressed, the file can be buffered and decompressed 1120. In response to determining 1115 the file has not been compressed, the content of the file an be streamed 1125.

The present disclosure, in various aspects, embodiments, and/or configurations, includes components, methods, processes, systems, and/or apparatus substantially as depicted and described herein, including various aspects, embodiments, configurations embodiments, sub-combinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

What is claimed is:

1. A method for retrieving at least a portion of a file stored in a repository, the method comprising:
    storing, by a cloud-based storage system, a plurality of files in the repository, wherein at least one of the files of the plurality of files comprises a multipart file, wherein the multipart file is segmented into a plurality of parts, each part comprising a plurality of frames, wherein each part of the plurality of parts is associated with an index for the plurality of frames in the part, and wherein at least one part of the plurality of parts is compressed before being stored by the cloud-based storage system;
    receiving, by the cloud-based storage system, a request to retrieve at least a portion of one of the plurality of files;
    obtaining, by the cloud-based storage system, object metadata for the requested one of the plurality of files;
    determining, by the cloud-based storage system, based on the obtained metadata, whether the requested one of the plurality of files is a multipart file;
    in response to determining the requested one of the plurality of files is not a multipart file, performing, by the cloud-based storage system a single file retrieval process; and
    in response to determining the requested one or the plurality of files is a multipart file, performing, by the cloud-based storage system, a multipart retrieval process, wherein performing the multipart retrieval process further comprises determining whether the received request to retrieve at least a portion of one of the plurality of files comprises a range request, and in response to determining the received request is a range request, calculating the selected parts of the file to retrieve using an index, setting up a range filter for the selected parts, and performing a multipart retrieval process for the selected parts of the file.

2. The method of claim 1, wherein the index for each of the plurality of parts comprises a frame number for each frame in the part, a frame offset for each frame in the part, a frame length for each compressed frame in the part, and an original length for each frame in the part.

3. The method of claim 1, wherein performing the multipart retrieval process for the selected parts of the file comprises:
    determining whether the file has been compressed; and
    in response to determining the file has been compressed, calculating a start from for retrieval based on the index, retrieving the requested range of frame from the calculated start frame, buffering the retrieved range of frame, and decompressing the retrieved range of frames.

4. The method of claim 1, further comprising, in response to determining the file has not been compressed, aligning a decryption offset and start position, retrieving the requested range, and streaming the retrieved part.

5. The method of claim 1, wherein performing the retrieval for all parts of the file comprises:
    retrieving the calculated selected part;
    checking an extended attribute for the retrieved part;
    determining, based on the extended attribute for the selected part, whether the selected part is compressed; and
    in response to determining the selected part is compressed, buffering a frame for the selected part and decrypting the frame for the selected part.

6. The method of claim 5, further comprising in response to determining the selected part is not encrypted, aligning a decryption offset and streaming the retrieved part.

7. A system comprising:
    a processor; and
    a memory coupled with and readable by the processor and storing therein a set of instructions which, when executed by the processor, causes the processor to retrieve at least a portion of a file stored in a repository by:
    storing a plurality of files in the repository, wherein at least one of the files of the plurality of files comprises a multipart file, wherein the multipart file is segmented into a plurality of parts, each part comprising a plurality of frames, wherein each part of the plurality of parts is associated with an index for the plurality of frames in the part, and wherein at least one part of the plurality of parts is compressed before being stored by the cloud-based storage system;

receiving a request to retrieve at least a portion of one of the plurality of files;

obtaining object metadata for the requested one of the plurality of files;

determining based on the obtained metadata, whether the requested one of the plurality of files is a multipart file;

in response to determining the requested one of the plurality of files is not a multipart file, performing a single file retrieval process; and in response to determining the requested one or the plurality of files is a multipart file, performing a multipart retrieval process, wherein performing the multipart retrieval process further comprises determining whether the received request to retrieve at least a portion of one of the plurality of files comprises a range request, and in response to determining the received request is a range request, calculating the selected parts of the file to retrieve using an index, setting up a range filter for the selected parts, and performing a multipart retrieval process for the selected parts of the file.

8. The system of claim 7, wherein the index for each of the plurality of parts comprises a frame number for each frame in the part, a frame offset for each frame in the part, a frame length for each compressed frame in the part, and an original length for each frame in the part.

9. The system of claim 7, wherein performing the multipart retrieval process for the selected parts of the file comprises:
determining whether the file has been compressed; and
in response to determining the file has been compressed, calculating a start from for retrieval based on the index, retrieving the requested range of frame from the calculated start frame, buffering the retrieved range of frame, and decompressing the retrieved range of frames.

10. The system of claim 7, further comprising, in response to determining the file has not been compressed, aligning a decryption offset and start position, retrieving the requested range, and streaming the retrieved part.

11. The system of claim 7, wherein performing the retrieval for all parts of the file comprises:
retrieving the calculated selected part;
checking an extended attribute for the retrieved part;
determining, based on the extended attribute for the selected part, whether the selected part is compressed; and
in response to determining the selected part is compressed, buffering a frame for the selected part and decrypting the frame for the selected part.

12. The system of claim 11, further comprising in response to determining the selected part is not encrypted, aligning a decryption offset and streaming the retrieved part.

13. A non-transitory, computer-readable medium comprising a set of instructions stored therein which, when executed by a processor, causes the processor to retrieve at least a portion of a file stored in a repository by:

storing a plurality of files in the repository, wherein at least one of the files of the plurality of files comprises a multipart file, wherein the multipart file is segmented into a plurality of parts, each part comprising a plurality of frames, wherein each part of the plurality of parts is associated with an index for the plurality of frames in the part, and wherein at least one part of the plurality of parts is compressed before being stored by the cloud-based storage system;

receiving a request to retrieve at least a portion of one of the plurality of files;

obtaining object metadata for the requested one of the plurality of files;

determining based on the obtained metadata, whether the requested one of the plurality of files is a multipart file;

in response to determining the requested one of the plurality of files is not a multipart file, performing a single file retrieval process; and in response to determining the requested one or the plurality of files is a multipart file, performing a multipart retrieval process, wherein performing the multipart retrieval process further comprises determining whether the received request to retrieve at least a portion of one of the plurality of files comprises a range request, and in response to determining the received request is a range request, calculating the selected parts of the file to retrieve using an index, setting up a range filter for the selected parts, and performing a multipart retrieval process for the selected parts of the file.

14. The non-transitory, computer-readable medium of claim 13, wherein the index for each of the plurality of parts comprises a frame number for each frame in the part, a frame offset for each frame in the part, a frame length for each compressed frame in the part, and an original length for each frame in the part.

15. The non-transitory, computer-readable medium of claim 13, wherein performing the multipart retrieval process for the selected parts of the file comprises:
determining whether the file has been compressed; and
in response to determining the file has been compressed, calculating a start from for retrieval based on the index, retrieving the requested range of frame from the calculated start frame, buffering the retrieved range of frame, and decompressing the retrieved range of frames.

16. The non-transitory, computer-readable medium of claim 13, further comprising, in response to determining the file has not been compressed, aligning a decryption offset and start position, retrieving the requested range, and streaming the retrieved part.

17. The non-transitory, computer-readable medium of claim 13, wherein performing the retrieval for all parts of the file comprises:
retrieving the calculated selected part;
checking an extended attribute for the retrieved part;
determining, based on the extended attribute for the selected part, whether the selected part is compressed;
in response to determining the selected part is compressed, buffering a frame for the selected part and decrypting the frame for the selected part; and
in response to determining the selected part is not encrypted, aligning a decryption offset and streaming the retrieved part.

* * * * *